United States Patent [19]

Hayashi et al.

[11] Patent Number: 4,953,694

[45] Date of Patent: Sep. 4, 1990

[54] DISTILLING APPARATUS

[75] Inventors: Nobuatsu Hayashi, Abiko; Sankichi Takahashi, Hitachi; Katsuya Ebara, Mito; Hideaki Kurokawa; Akira Yamada, both of Hitachi; Yasuo Koseki, Hitachiota; Harumi Matsuzaki, Hitachi; Hiroaki Yoda, Tsuchiura, all of Japan

[73] Assignee: Hitachi, Ltd., Tokyo, Japan

[21] Appl. No.: 208,212

[22] Filed: Jun. 17, 1988

Related U.S. Application Data

[63] Continuation-in-part of Ser. No. 942,795, Dec. 17, 1986, abandoned.

[30] Foreign Application Priority Data

Dec. 18, 1985 [JP] Japan .................................. 60-282901
Feb. 5, 1986 [JP] Japan .................................... 61-21938

[51] Int. Cl.$^5$ ............................................. B01D 61/00
[52] U.S. Cl. ........................................ 202/180; 55/208; 159/2.1; 159/DIG. 27; 159/DIG. 28; 202/182; 202/197; 202/200; 202/202; 202/236; 203/10; 203/40; 203/88; 203/90; 210/638; 210/641
[58] Field of Search ............... 202/236, 200, 180, 182, 202/197, 202; 159/2.1, 3, DIG. 27, DIG. 28, 48.2; 203/88, 10, 40, 90; 210/638, 641, 900, 669; 55/208

[56] References Cited

U.S. PATENT DOCUMENTS

| | | | |
|---|---|---|---|
| 2,788,316 | 4/1957 | Bjorksten | 159/DIG. 27 |
| 2,893,926 | 7/1959 | Worthen et al. | 202/82 |
| 3,276,458 | 10/1966 | Iverson et al. | 210/900 |
| 3,340,186 | 9/1967 | Weyl | 159/DIG. 27 |
| 3,418,214 | 12/1966 | Cane | 202/176 |
| 3,455,792 | 7/1969 | Ohta | 159/DIG. 27 |
| 3,540,986 | 11/1970 | Guarino | 159/DIG. 28 |
| 3,563,860 | 2/1971 | Henderyckx | 159/DIG. 28 |
| 3,649,467 | 3/1972 | Winsel et al. | 159/DIG. 28 |
| 3,860,492 | 1/1975 | Lowi, Jr. et al. | 159/DIG. 28 |
| 3,878,054 | 4/1975 | Rodgers | 203/11 |
| 4,105,505 | 8/1978 | Saari | 202/180 |
| 4,308,111 | 12/1981 | Pampel | 203/49 |
| 4,326,923 | 4/1982 | Mortenson | 159/DIG. 27 |
| 4,430,226 | 2/1984 | Hegde et al. | 210/900 |
| 4,545,862 | 10/1985 | Gore et al. | 159/DIG. 27 |
| 4,595,498 | 6/1986 | Cohen et al. | 210/195.1 |
| 4,610,790 | 9/1986 | Reti et al. | 210/641 |
| 4,620,900 | 11/1986 | Kimura et al. | 159/DIG. 28 |
| 4,655,909 | 4/1987 | Furuno | 210/900 |
| 4,728,397 | 3/1988 | Kjellander et al. | 203/10 |

FOREIGN PATENT DOCUMENTS

| | | | |
|---|---|---|---|
| 1027314 | 3/1953 | France | 159/DIG. 28 |
| 0092373 | 8/1978 | Japan | 210/641 |

Primary Examiner—Virginia Manoharan
Attorney, Agent, or Firm—Antonelli, Terry, Stout & Kraus

[57] ABSTRACT

A distilling apparatus includes an evaporation section which heats raw water and causes the generation of vapor from said raw water, and a hydrophobic porous film through which the thus generated vapor is filtered. Because vapor separated from the raw water is supplied to one surface of the hydrophobic porous film, the proportion of the vapor relative to the fluid supplied to that surface of the film can be increased, thereby enabling the efficient filtering of a large amount of vapor through the film. In addition, because the temperature of condensed water obtained by cooling the vapor can be kept in the vicinity of the boiling point thereof, any gases and volatile substances contained in the raw water are prevented from dissolving in the distilled water, thereby enabling the production of extremely pure distilled water.

5 Claims, 6 Drawing Sheets

DISTILLING APPARATUS

CROSS-REFERENCE TO RELATED APPLICATION

This is a CONTINUATION IN PART of the Application, Ser. No. 942795 filed on Dec. 17, 1986, now abandoned.

BACKGROUND OF THE INVENTION

1. Field of the Invention:

The present invention relates to a distilling apparatus which is adapted to obtain extremely pure or ultrapure distilled water containing a very small amount of impurities from raw water.

2. Description of the Prior Art:

Distilled water of a high purity (also called "ultrapure water") which contains a very small amount of impurities is conventionally demanded by the electronics industry for manufacturing semiconductors and the pharmaceutical industry for manufacturing pharmceutical substances.

In particular, when manufacturing precise semiconductor devices such as integrated circuits (ICs) and large scale integrated circuits (LSIs), a large amount of distilled water is used in washing process and, therefore, the purity of the distilled water which is used can directly effect the production yield. For this reason, the stable production of extremely pure distilled water is an important point.

In a conventional distilling apparatus, heated raw water is supplied to a hydrophobic porous film and is brought into contact therewith, and vapor generated from the raw water filters through the hydrophobic porous film. However, since the raw water is directly supplied to one surface of the hydrophobic porous film, the proportion of vapor generated on the side of that surface is small, thus making it difficult for a large amount of vapor to filter through the film.

In addition, the hydrophobic porous film has a large number of small holes formed therein, and vapor which is generated from the surface of the raw water, which is in a state wherein it slightly penetrates the holes, filters therethrough. Thereafter, the filtered vapor is condensed by means of cooling water so as to obtain distilled water. However, when the vapor filters through the hydrophobic porous film, gases (e.g., carbonic dioxide gas and oxygen gas) as well as volatile substances which are dissolved in the raw water also evaporate and pass through the film. Therefore, the gases and volatile substances are dissolved in the condensed product, thus impeding the effort of increasing the degree of purity. In conventional apparatuses, no particular attention has been paid to this problem. One example of the prior art relating to this type of apparatus is that disclosed in U.S. Pat. No. 3,563,860.

SUMMARY OF THE INVENTION

An object of the invention is to provide a distilling apparatus which is capable of obtaining a large amount of distilled water from raw water at a high degree of efficiency.

Another object of the invention is to provide a distilling apparatus which is capable of obtaining extremely pure distilled water.

A further object of the invention is to provide a distilling apparatus which is designed to reduce its energy consumption.

According to the invention, a distilling apparatus produces ultrapure water by condensing vapor generated from raw water. A a raw water tank collects raw water, with a first heating means being arranged in the raw water tank for heating and hence degassing the raw water. Means are provided for feeding the degassed water into a closed cylindrical main body, with a second heating means being provided in the main body for heating the degassed water to generate a vapor therefrom. An evaporation chamber is filled with the generated vapor, and a condensation chamber defined by a hydrophobic porous film which allows the generated vapor to pass from the evaporation chamber into the condensation chamber. A means is provided for condensing the vapor passed through the hydrophobic porous film into the condensation chamber, and a distilled water tank is formed in the condensation chamber.

According to further features of the invention, a distilling apparatus producing ultrapure water includes a closed main distilling body, with means for introducing the raw water to the main distilling body. Heating means are provided which includes a heater for heating the raw water above a saturation temperature of the raw water, with means being provided for separating the main distilling body into an evaporation chamber including a hydrophobic porous film which allows a generated vapor to pass from the evaporation chamber into the condensation chamber but does not allow liquid to pass from the evaporation chamber to the condensation chamber. Means are provided in the evaporation chamber for generating vapor from the raw water heated by the heating means, with the vapor generating means including means for flash evaporating the raw water heated by the heating means. Means are provided for condensing the vapor passed through the hydrophobic porous film into the condensation chamber, with the condensing means including a cooling pipe through which raw water flows, and a distilled water tank is formed in the condensation chamber.

The above and other objects, features and advantages of the invention will become more apparent from the following description taken in conjunction with the accompanying drawings.

DESCRIPTION OF THE PREFERRED EMBODIMENTS

Figure 1:
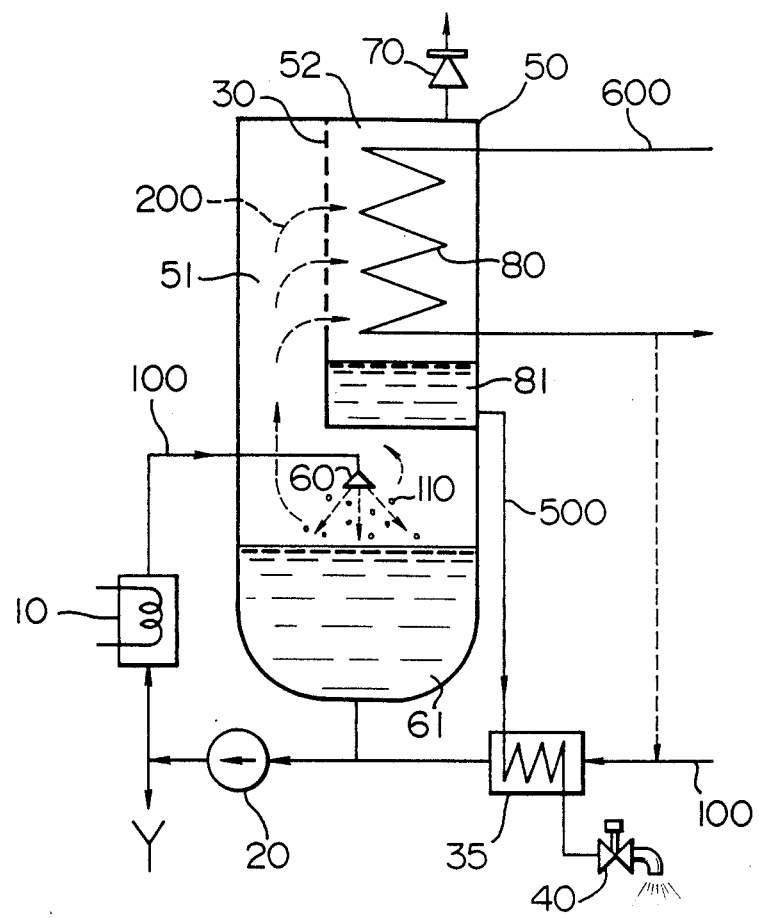
FIG. 1 is a view of the whole arrangement of a distilling apparatus in accordance with a first embodiment of the invention.

Preferred embodiments of the present invention will now be described with reference to the drawings In FIG. 1, the apparatus comprises a main distilling apparatus body 50, a heater 10, a recirculation pump 20, and a heat economizer 35. The main body 50 is divided into an evaporation chamber 51 and condensation chamber 52 by a hydrophobic porous film 30. A nozzle 60 which discharges heated raw water 100 is disposed in the evaporation chamber 51 whose bottom forms a raw water tank 61. A cooling pipe 80 is disposed in the condensation chamber 52 whose bottom is formed into a distilled water tank 81. The raw water 100 is introduced into the heat economizer 35 wherein it exchanges heat with distilled water 500 and is heated thereby, and is then led to the heater 10 through the pump 20 to be heated. In the heater 10, the raw water 100 is heated to a temperature which is a few degrees higher than the saturated vapor temperature within the evaporation chamber 51 (the difference between the water temperature and the saturated vapor temperature is called "the flash temperature" which is normally about 3° to 5° C., and the state of vapor in which it is heated to a temperature above the saturation temperature is called "the superheated state"). The thus heated raw water 100 is discharged into the evaporation chamber 51 through the nozzle 60 and instantly self-evaporates, generating a large amount of fine water droplets 110. Evaporation proceeds on the surface of the water droplets, and the temperature of the droplets drops to the vapor saturation temperature within the evaporation chamber 51. Vapor 200 generated in the chamber 51 flows into the condensation chamber 52 together with the water droplets 110, but when they filter through the hydrophobic porous film 30, the water droplets 110 are completely separated, so that the vapor 200 alone is introduced into the condensation chamber 52. In the chamber 52, the vapor 200 is cooled and allowed to condense on the surface of the cooling pipe 80 through which cooling water 600 flows, so as to become distilled water 500 which is collected in the distilled water tank 81.

As described above, the apparatus is arranged in such a manner that only vapor and water droplets which have been separated from the raw water 110 are supplied to one surface of the hydrophobic porous film 30. Therefore, the proportion of vapor relative to the fluid supplied to that one surface of the film 30 can be increased, thus enabling the efficient filtering of a large amount of the vapor through the film 30.

When required, the distilled water 500 in the distilled water tank 81 is discharged by a valve 40 located at a point of use and is used for washing, etc. In general, since the distilled water 500 stored in the tank 81 has a relatively high temperature on the order of several tens of degrees, when it is discharged from the valve 40, it is cooled by utilizing the raw water 100 in the heat economizer 35.

With this apparatus for producing distilled water, which is normally operated under a pressure which is approximately equal to atmospheric pressure, the raw water 100 in the evaporation chamber 51 has a temperature on the order of 100° C., having been heated to a temperature of about 105° C. by the heater 10. Because the interior of the evaporation chamber 51 is filled with the saturated vapor 200 and the water droplets 110, the distilled water 500 within the adjacent distilled water tank 81 has a temperature of about 100° C. which is the boiling point of water.

In this way, since the apparatus is operated at an internal temperature in the vicinity of 100° C., any bacteria and the like contained in the raw water are killed by the high temperature, thus providing a sterilization effect. In addition, the flash evaporation which takes place in the apparatus causes the small amounts of air and carbon dioxide gas dissolved in the raw water to be discharged. In the evaporation chamber 51, when the vapor evaporates from the raw water at a temperature on the order of 100° C., a small amount of volatile organic substances (which have boiling points of below 100° C.) are also discharged. However, since the distilled water 500 in the tank 81 has the same temperature as that within the evaporation chamber 51, as described before, the thus discharged volatile organic substances are not readily re-absorbed by the distilled water 500. The same is true for air and carbonic acid dissolved in the raw water and generated in the evaporation chamber 51. The air and carbonic acid are not readily dissolved in the distilled water in the tank 81 and hence are not re-absorbed. Instead, they are discharged to the outside through an exhaust valve 70. This exhaust valve 70 is of the check valve type which has a body whose interior is pressurized to a pressure slightly higher than that of the outside so as to prevent any backward flow of air, etc., from the outside. In the embodiment of FIG. 1, part of the cooling water 600 may be used as the raw water. Additionally, although the distilled water tank 81 is positioned at a level higher than the valve 40 to provide a head which facilitates the discharge of distilled water 500 from the valve 40, this is not limitative. If it is necessary to discharge distilled water at a high pressure from the valve located at the point of use, a pump may be provided. As described above, according to the embodiment of FIG. 1 the, the following advantages are provided, in contrast with the prior art: distilled water of a high degree of purity can be obtained by a single evaporation and condensation operation, and, at the same time, by virtue of the phenomenon of flash evaporation and the provision of the hydrophobic porous film 30, extremely pure distilled water can be obtained by a compact apparatus with a high evaporation efficiency.

Figure 2:
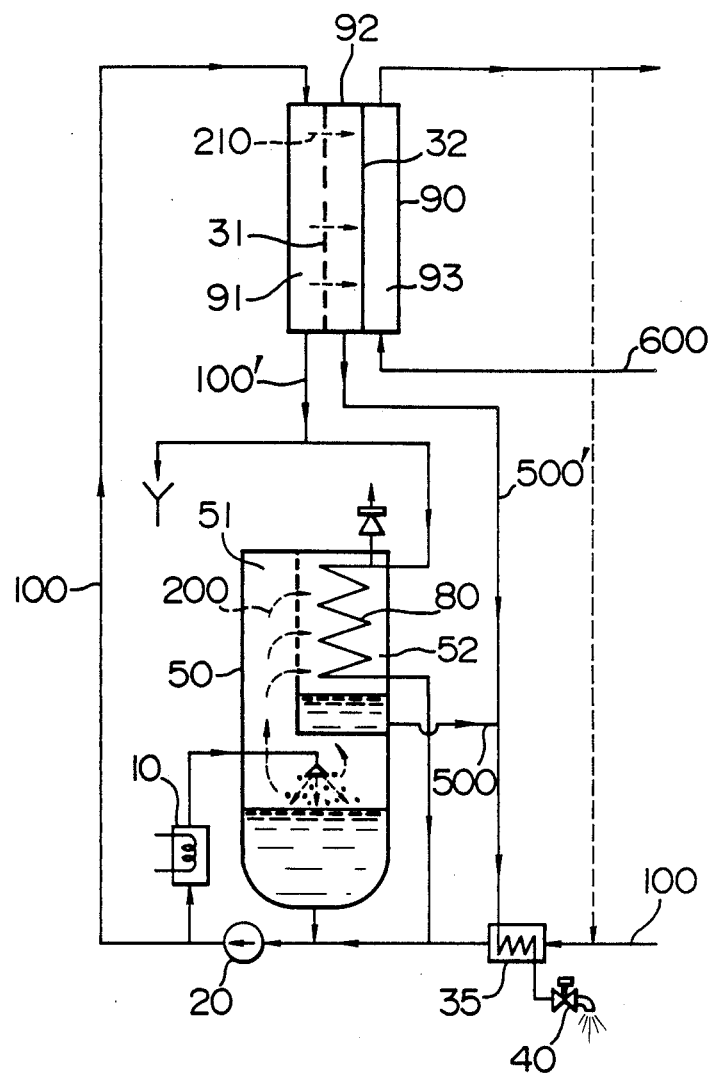
FIG. 2 is a view of a distilling apparatus in accordance with a second embodiment of the invention which is directed to a reduction in energy consumption.

In the embodiment of FIG. 2, the heating capacity of the heater is reduced to achieve a reduction in energy consumption. An apparatus in accordance with the embodiment of FIG. 2 is adapted to recover the heat which is generated when vapor is, in the same way as in the embodiment of FIG. 1, cooled and condensed by the cooling pipe 80, and to produce distilled water 500' by further employing a thermobar vaporization device 90. Therefore, in the embodiment of FIG. 2, only the thermobar vaporization device 90 is provided in addition to the arrangement in accordance with the embodiment of FIG. 1. The thermobar vaporization device 90 comprises a hydrophobic porous film 31, a cooling surface 32, a raw water chamber 91, a cooling chamber 93, and an air chamber 92, with the chambers 91, 92 being separated by the film 31 and the chambers 92, 93 being separated by the cooling surface 32. Raw water 100 at a high temperature into the raw water chamber 91 and is supplied to a surface of the porous film 31 on which vapor 210 evaporates, and the vapor 210 thus generated from the water 100 passes through the air chamber 92 and is then cooled and condensed on the cooling surface 32, thereby producing distilled water 500′. The main body 50 and the thermobar vaporization device 90 are connected in the following manner. First, raw water 100′ is heated by utilizing the cooling heat obtained from the cooling pipe 80 in the condensation chamber 52 of the main body 50, and the raw water 100′ is sent to the raw water chamber 91 of the thermobar vaporization device 90 wherein the water 100′ is allowed to evaporate on the surface of the hydrophobic porous film 31. Part of the raw water 100′, whose temperature is now reduced, is drained away while the remainder is returned to the cooling pipe 80 of the main body 50, in which it is heated again by the condensation heat, and is then recirculated to the raw water chamber 91 by the pump 20. By incorporating the thermobar vaporization device 90, the heat supplied to the apparatus is used in the flash evaporation in the main body 50, via the heater 10, so as to obtain distilled water 500 from the condensation of vapor resulting from the flash evaporation, and, at the same time, the condensation heat resulting from the above condensation is recovered by the cooling pipe 80 to heat the raw water 100′ which is then allowed to evaporate in the thermobar vaporization device 90 so as to obtain distilled water 500′. With this arrangement, the amount of heat consumed can be reduced to a level which is about half the level of with the embodiment of FIG. 1.

Figure 3:
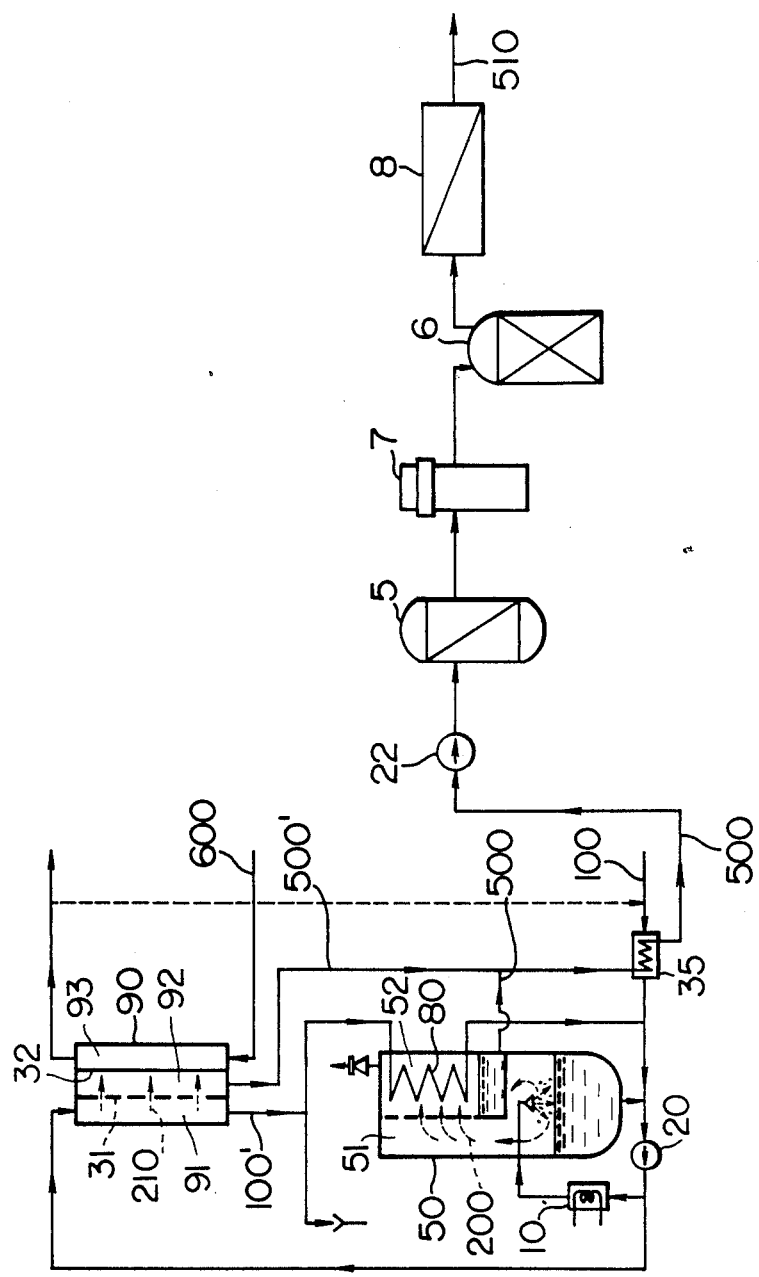
FIG. 3 is a view of a distilling apparatus in accordance with a third embodiment of the invention which is directed to obtaining high degree of purity.

A distilling apparatus of FIG. 3 is adapted to perform ultra-distillation to obtain an ultra-high degree of purity (this operation is normally called "ultra-ultra distillation"). More specifically, in the embodiment of FIG. 3, a conventionally-known secondary pure water system is combined with the embodiment shown in FIG. 2. In order to obtain ultra-ultra-pure distilled water 510, distilled water 500 obtained by the main body 50 and the thermobar vaporization device 90 is further passed by a pump 22 through an activated carbon absorption tower 5 for absorbing a very small amount of organic substances contained in the distilled water, an ultraviolet sterilizer 7 for sterilizing microorganisms by irradiating ultraviolet, a polisher 6 for removing a very small amount of ionic substances by effecting ion exchange, and an ultrafilter 8 for trapping solid matter such as minute particles. One of the effects of the embodiment of FIG. 3 is that ultra-ultrapure water of an ultra-high degree of purity (total solid (TS) is below 0.01) ppm can be obtained. In general, the activated carbon, absorption tower 5, the polisher 6, and the ultraviolet sterilizer 7, which are disposed downstream of the apparatus, need to be replaced periodically because of their limited effective life relative to their absorption and ion-exchange capacities and to the degree of clogging of the ultraviolet sterilizer 7. However, in accordance with the embodiment of FIG. 3 since the activated carbon absorption tower 5, polisher 6, and ultraviolet sterilizer 7 are disposed downstream of the distilling apparatus which forms the main part of the invention, their effective life can be considerably lengthened.

Figure 4:
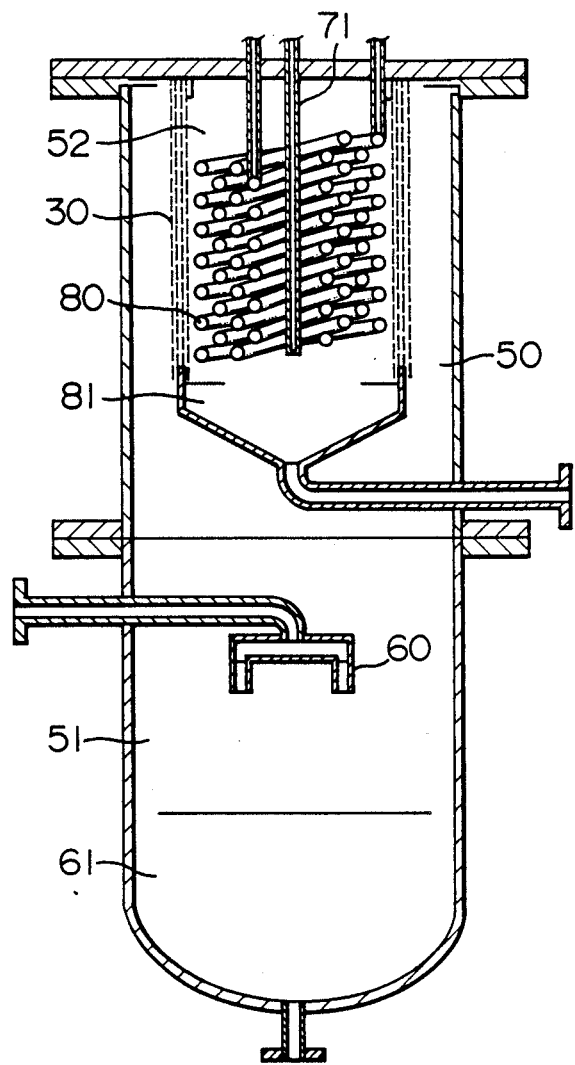
FIG. 4 is a view of a more specific structure of a main body of the apparatus in accordance with the invention.

As shown in FIG. 4, the main body 50 of the distilling apparatus has a vertical structure in which a flash evaporation nozzle 60 and a tank 61 for storing water which has not yet been evaporated are disposed in a lower portion, and a condensation chamber 52 including a hydrophobic porous film 30, a cooling pipe 80 for condensation, and a distilled water tank 81 are disposed in an upper portion. The main body 50 is thus adapted to achieve the advantages and effects hereinbefore described, as well as to require a minimum of mounting area.

The nozzle 60 comprises one or more pipes which have the following dimensions determined from fundamental experiments: a diameter which is suitable for realizing a flow speed of the fluid being discharged of not more than 30 m/s., and a length of not more than 300 mm. Although the direction of the discharge is not specifically limited, it is not preferable, at least, to have it in a direction that helps to increase the speed at which the generated spray advances upward in the direction of the condensation chamber 52. In this case, it is possible to use a member for reversing the direction of advancement.

In order to increase the efficiency of the film 30 which is made of a hydrophobic porous material, the film 30 should have a wider area within a smaller volume. From this view point, the film 30 should preferably have a pleated structure which is disposed vertically. By virtue of this structure, spray accompanying the vapor can be separated therefrom on the surface of the hydrophobic porous film 30 and can immediately drop downward in the vertical direction, and be received in the tank 61 for storing unvaporized water. Therefore, a condition which enables the filtration of the vapor can always be maintained on the surface of the hydrophobic film 30.

The cooling pipe 80 may either be of a winding type or a straight type, but basically, an extraction pipe 71 should be disposed in a region at which the temperature is lowest in the condensation chamber 52.

In addition, the surfaces of members which are in contact with the distilled water, such as the distilled water tank 81, should have a surface roughness of not more than 0.1 $\mu$m in order to prevent any microscopic retention of fluid and thus to prevent any reduction in the degree of purity. Therefore, such members should preferably be made of a material which is either SUS304 or SUS316, subjected to surface finishing and the formation of an oxidation film.

Figure 6:
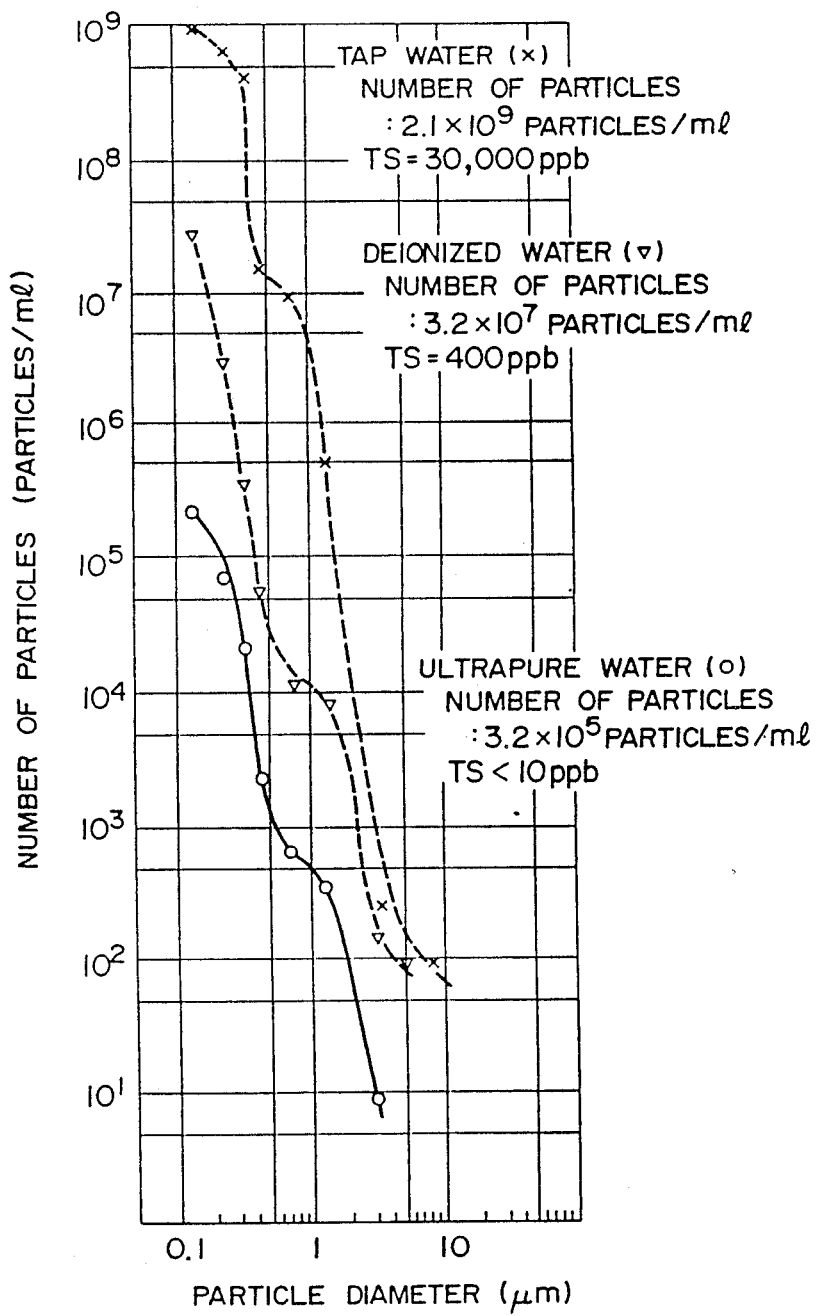
FIG. 6 is a view showing the performance of the fourth embodiment in comparison with a conventional apparatus.

Although not illustrated, the nozzle 60 and the condensation chamber 52 may be arranged in the horizontal direction. In FIG. 6, the raw water 100 is collected in a raw water tank 55, and the collected raw water is heated by a heater 10 disposed in the raw 100 tank 55. Since the raw water is heated, gases such as carbon dioxide and oxygen, volatile organic substances, ammonia, etc. dissolved in the raw water 100 is removed therefrom. The water 101 which has been heated by the heater 10 are fed into the main body 50 by a pump 20. After the water 101 has been fed into the main body 50, the water 101 is treated in the same manner as the case of the first embodiment shown in FIG. 1.

Figure 5:
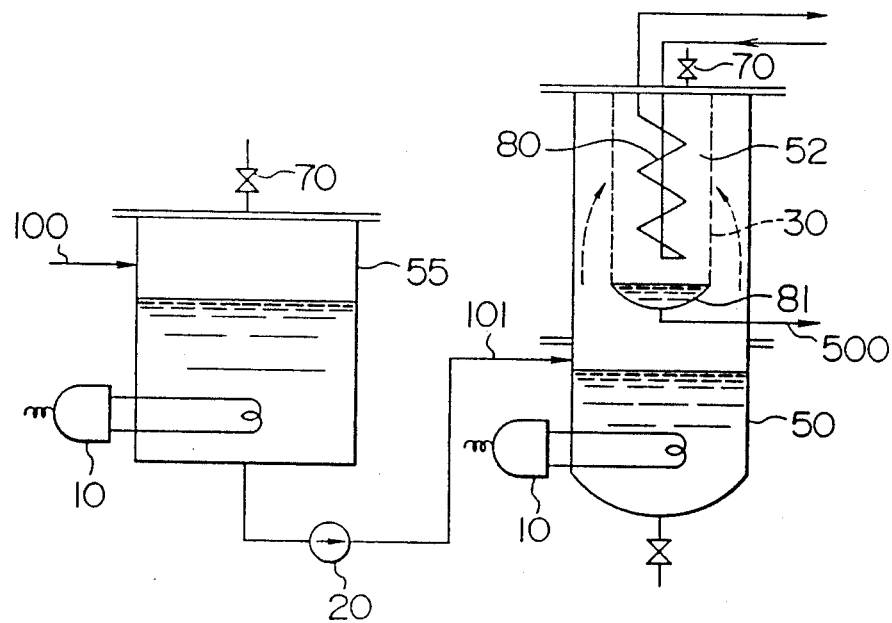
FIG. 5 is a view of a distilling apparatus in accordance with a fourth embodiment of the invention which is directed to obtaining a high degree of purity.

The main body 50 is made of stainless steel, and the inner surface thereof is subject to mirror surface finishing. Further, a hydrophobic porous film 30 is made of polytetrafluoroethylene, and its thickness, pore diameter and the porosity are 100 $\mu$m, 0.2 $\mu$m and 0.8, respectively. The embodiment of FIG. 5 can produce ultrapure water of higher purity than the purity of ultrapure water produced by the embodiment shown in FIG. 1. The number of particles contained in the ultrapure water produced by the embodiment of FIG. 5 is shown in FIG. 6 in comparison with that produced by the prior art apparatus.

FIG. 6 shows the results of measuring the concentration of impurities or total solid TS of ultapure water generated from the film or membrane distillation and ordinary deionized water. In the case of ultrapure water produced by the embodiment of FIG. 5, $3 \times 10^5$ particles/ml with diameters of 0.15–3 μm were generated, manning 10 ppb of TS. On the other hand, in deionized water, $3 \times 10^7$ particles/ml with diameters of 0.15–3 μm were generated, meaning 400 ppb of TS. There was an obvious difference between these two product values. The analysis of potable water shown in FIG. 6 was 30000, ppb of TS.

As described above, according to the present invention, a large amount of vapor can be efficiently filtered through the hydrophobic porous film, whereby the efficiency of the production of ultrapure distilled water can be enhanced.

In addition, since any gases and volatile substances contained in the raw water can be removed, advantages such as the possibility of obtaining distilled water of a high degree of purity can be ensured.

What is claimed is:

1. A distilling apparatus for producing ultrapure water by condensing vapor generated from raw water, the distilling apparatus comprising:
   means for defining a closed cylindrical main distilling body;
   raw water tank means formed in said main distilling body for collecting raw water therein;
   first heating means for heating and hence degassing the raw water at a pressure approximately equal to atmospheric pressure;
   means for feeding the degassed water into the closed cylindrical main distilling body;
   second heating means for heating the degassed water fed thereto at a pressure approximately equal to atmospheric pressure;
   a hydrophobic porous film means arranged in said closed cylindrical main distilling body so as to divide the same into an evaporation chamber means for generating vapor from the degassed water heated by said second heating means and a condensation chamber means for receiving the vapor from the evaporation chamber means after passing throughout the hydrophobic porous film means into said condensation chamber means;
   means disposed in said condensation chamber means for condensing the vapor passed through the hydrophobic porous film means into said condensation chamber means; and
   distilled water tank means formed in said condensation chamber means for collecting distilled water from the condensing means.

2. A distilling apparatus as claimed in claim 1, wherein each of said first and second heating means includes a heater for heating the raw water to a boiling temperature.

3. A distilling apparatus as claimed in claim 1, wherein said condensing means includes a cooling pipe through which a cooling water flows.

4. A distilling apparatus for producing ultrapure water from raw water, the distilling apparatus comprising:
   main distilling body means separated into an evaporator chamber means and a condensation chamber means, said main distilling body means including a raw water tank in a lower portion of the evaporation chamber means and a distilled water tank in a lower portion of said condensation chamber means;
   means for introducing raw water into said evaporator chamber means;
   heating means for heating said water being introduced to a temperature above a saturation temperature of said raw water at a pressure approximately equal to atmospheric pressure;
   means for generating vapor from said heated raw water introduced to said evaporation chamber means;
   a hydrophobic porous film means for allowing said vapor to pass from said evaporation chamber means to said condensation chamber means without allowing liquid to pass from said evaporation chamber means to said condensation chamber means;
   means disposed in said condensation chamber means for condensing said vapor in said condensation chamber means such that the vapor becomes distilled water and is collected in said distilled water tank;
   a thermobar vaporization means connected with said main distilling body means, said thermobar vaporization means comprising:
   raw water chamber means for receiving raw water;
   air chamber means located next to said raw water chamber means;
   a cooling chamber means located next to said air chamber means;
   a hydrophobic porous film means for separating said raw water chamber means and said air chamber means;
   a cooling surface separating said air chamber means and said cooling chamber means;
   means for feeding raw water from said condensation means to said raw water chamber means; and
   means for feeding raw water from said raw water chamber means to said condensation chamber means.

5. A distilling apparatus as claimed in claim 4, further comprising:
   activated carbon absorption tower means connected to said thermobar evaporation means;
   ultraviolet sterilizer means connected to said absorption tower means;
   polisher means connected to said ultraviolet sterilizer means;
   ultrafilter means connected to said polisher means;
   means for feeding said distilled water to said absorption tower means; and
   means for feeding condensed water from said condensation chamber means to said absorption tower means.

* * * * *